US009113446B2

(12) United States Patent
Morioka

(10) Patent No.: US 9,113,446 B2
(45) Date of Patent: *Aug. 18, 2015

(54) COMMUNICATION APPARATUS, COMMUNICATION METHOD, AND COMMUNICATION SYSTEM

(71) Applicant: SONY CORPORATION, Tokyo (JP)

(72) Inventor: Yuichi Morioka, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/177,723

(22) Filed: Feb. 11, 2014

(65) Prior Publication Data

US 2014/0161097 A1 Jun. 12, 2014

Related U.S. Application Data

(63) Continuation of application No. 13/071,547, filed on Mar. 25, 2011, now Pat. No. 8,712,418.

(30) Foreign Application Priority Data

Apr. 6, 2010 (JP) ................................ 2010-087485

(51) Int. Cl.
H04B 7/00 (2006.01)
H04W 72/02 (2009.01)
H04B 7/02 (2006.01)
H04W 72/12 (2009.01)
H04W 92/18 (2009.01)

(52) U.S. Cl.
CPC .............. *H04W 72/02* (2013.01); *H04B 7/024* (2013.01); *H04W 72/1289* (2013.01); *H04W 92/18* (2013.01)

(58) Field of Classification Search
USPC .............. 455/500, 550.1, 552.1, 67.11, 63.1, 455/443–448; 370/315–320
See application file for complete search history.

(56) References Cited

U.S. PATENT DOCUMENTS

| 8,583,159 | B2* | 11/2013 | Li et al. ......................... 455/522 |
| 2005/0272380 | A1* | 12/2005 | Stacey ............................ 455/70 |
| 2008/0075038 | A1* | 3/2008 | Jin et al. ........................ 370/329 |
| 2008/0175198 | A1* | 7/2008 | Singh et al. .................... 370/329 |

(Continued)

FOREIGN PATENT DOCUMENTS

| JP | 2009-147485 | 7/2009 |
| JP | 2009-188925 | 8/2009 |
| WO | WO 2008/075856 A1 | 6/2008 |

OTHER PUBLICATIONS

Extended European Search Report issued Sep. 1, 2011 in Patent Application No. 11158425.6.

(Continued)

*Primary Examiner* — Fayyaz Alam
(74) *Attorney, Agent, or Firm* — Oblon, McClelland, Maier & Neustadt, L.L.P.

(57) ABSTRACT

A wireless communication system, method and apparatus cooperate to use a wireless coordination signal from a control station in a first frequency band to establish direct links in a second frequency band between different terminals. Once established, the direct links in the second frequency band operate without further needing intervention by the control station. The first frequency band is 1 GHz or higher, and the second frequency band is at a higher frequency than the first frequency band.

18 Claims, 13 Drawing Sheets

(56) References Cited

U.S. PATENT DOCUMENTS

| | | | |
|---|---|---|---|
| 2008/0311852 A1* | 12/2008 | Hansen et al. | 455/41.2 |
| 2009/0168650 A1* | 7/2009 | Kesselman | 370/235 |
| 2010/0027494 A1 | 2/2010 | Kwon et al. | |
| 2010/0273428 A1* | 10/2010 | Kimura et al. | 455/63.3 |
| 2011/0086664 A1* | 4/2011 | Li et al. | 455/522 |
| 2012/0214534 A1* | 8/2012 | Zhu et al. | 455/517 |

OTHER PUBLICATIONS

Combined Chinese Office Action and Search Report issued Sep. 12, 2014 in Patent Application No. 201110074135.9 (with English language translation).

* cited by examiner

COMMUNICATION APPARATUS, COMMUNICATION METHOD, AND COMMUNICATION SYSTEM

CROSS-REFERENCE TO RELATED APPLICATIONS

This application is a continuation of and is based upon and claims the benefit of priority under 35 U.S.C. §120 for U.S. Ser. No. 13/071,547, filed Mar. 25, 2011 and claims the benefit of priority under 35 U.S.C. §119 from Japanese Patent Application No. 2010-087485, filed Apr. 6, 2010. The entire contents of which are incorporated herein by reference.

BACKGROUND OF THE INVENTION

1. Field of the Invention

The present invention relates to communication apparatuses, communication methods, and communication systems using millimeter waves to perform wireless communication and, more particularly, to a communication apparatus, a communication method, and a communication system capable of securing appropriate coordination with multiple communication partners performing millimeter-wave communication.

2. Description of the Related Art

Very high-speed data communication can be realized by wireless communication using millimeter waves, which uses a wavelength of 10 mm to 1 mm and a frequency of 30 GHz to 300 GHz and which can allocate channels in units of GHz. For example, in Institute of Electrical and Electronics Engineers (IEEE) 802.11 ad, standardization of wireless local area network (LAN) standard using a 60 GHz band is being advanced. Since the millimeter waves have shorter wavelengths and higher linearity, compared with microwaves being in widespread use in, for example, wireless LAN technologies, a very large amount of information can be transmitted by using the millimeter waves. However, since reflection of the millimeter waves is accompanied by strong attenuation, direct waves and waves reflected no more than once are mainly transmitted on the wireless communication path. In addition, since the millimeter waves have higher transmission loss, the millimeter waves have the property that radio signals are not transmitted to a distance.

In order to resolve such a communication distance problem of the millimeter waves, methods are considered in which directivity is given to the antennas of transmitters-receivers and the transmission beams and the reception beams of the transmitters-receivers are directed to directions where communication partners are positioned to increase the communication distance. However, the methods have drawbacks in that signals do not reach neighboring stations at directions other than the directions of the communication partners although the transmission-reception power is increased at the directions of the communication partners. Accordingly, the directional communication is not appropriate for coordination between multiple communication stations.

In IEEE 802.11n, directional communication using microwaves having a frequency band of 2.4/5 GHz is defined. In this directional communication, packets for the coordination are transmitted at a rate lower than that of data packets to allow scheduling information to be transmitted to neighboring stations within a wider range. However, a sufficient amount of scheduling information may not reach the neighboring stations at a frequency band of 60 GHz even if the packets are transmitted at a lower rate.

In addition, wireless communication apparatuses are proposed (for example, refer to Japanese Unexamined Patent Application Publication No. 2009-188925), in which search tones are transmitted by using the millimeter waves while the radiation directions of directional antennas are reciprocated and rotated at a constant angular velocity in 360 degrees on the horizontal plane and communication nodes are searched for on the basis of response tones returned from the communication nodes that have received the search tones. However, it takes a time to reciprocate and rotate the search tones to search for the communication nodes in 360 degrees.

SUMMARY OF THE INVENTION

It is desirable to provide an excellent communication apparatus, communication method, and communication system capable of appropriate coordination with multiple communication partners performing millimeter wave communication.

In one embodiment, a wireless communication station includes a wireless transceiver including
- a first frequency receiver configured to receive a wireless coordination signal in a first frequency band from a control station, the wireless coordination signal including scheduling information that manages direct communications between the wireless communication station and another wireless communication station, and
- a second frequency transceiver configured to perform wireless communications in a second frequency band with the another wireless communication station in accordance with the scheduling information, a lowest frequency of the first frequency band being 1 GHz or higher.

In the exemplary systems, methods and apparatuses, a center frequency ratio of the second frequency band to the first frequency band may be at least 12:1.

In the exemplary systems, methods and apparatuses, the first frequency band may be centered at approximately 5 GHz, and the second frequency band may be centered at approximately 60 GHz.

The wireless transceiver may include a controller that processes the wireless coordination signal to extract the scheduling information, and establishes a direct communication link with the another communication station in accordance with the scheduling information, the scheduling information specifying a priority use period for the wireless transceiver and another priority use period for the another communication station.

A first frequency transceiver may be included that includes the first frequency receiver, the first frequency transceiver being configured to transmit a data transmission request to the control station to initiate the wireless coordination signal from the control station.

Optionally, the second frequency transceiver performs wireless communication with the another wireless communication station in the second frequency band in accordance with the scheduling information while a third communication station performs wireless communication with a fourth communication station in the second frequency band also in accordance with the scheduling information.

Optionally, the second frequency transceiver performs wireless communication with the another wireless communication station in the second frequency band in accordance with the scheduling information and also performs wireless communications in the second frequency band with a third communication station also in accordance with the scheduling information, although the scheduling information prohibits its direct link communication between the another communication station and the third communication station.

Another embodiment is directed to a control station, or apparatus, for controlling wireless communications, including:

a transmitter configured to transmit a wireless coordination signal in a first frequency band to a wireless communication station and another wireless control station, the wireless coordination signal including scheduling information that manages direct communications in a second frequency band between the wireless communication station and another wireless communication station; and a processor that assigns communication resources for the direct communications in the second frequency band, a lowest frequency of the first frequency band being 1 GHz or higher.

Another exemplary embodiment includes receiving a wireless coordination signal in a first frequency band from a control station, the wireless coordination signal including scheduling information that manages direct communications in a second frequency band between a wireless communication station and another wireless communication station; and establishing the direct wireless communications between the wireless communication station and the another wireless communication station in accordance with the scheduling information, a lowest frequency of the first frequency band being 1 GHz or higher.

Yet another exemplary embodiment includes assigning with a processor communication resources for direct communications in a second frequency band between wireless communication stations; and transmitting a wireless coordination signal in a first frequency band to a wireless communication station and another wireless control station, the wireless coordination signal including scheduling information that manages an establishment of the direct communications between the wireless communication station and another wireless communication station, wherein a lowest frequency of the first frequency band being 1 GHz or higher.

An exemplary wireless communication system includes
a control station that has
a transmitter configured to transmit a wireless coordination signal in a first frequency band to a wireless communication station and another wireless control station, the wireless coordination signal including scheduling information that manages direct communications in a second frequency band between the wireless communication station and another wireless communication station, and
a processor that assigns communication resources for the direct communications in the second frequency band, a lowest frequency of the first frequency band being 1 GHz or higher; and
the wireless communications station that includes
a wireless transceiver having a first frequency receiver and a second frequency transceiver,
the first frequency receiver being configured to receive the wireless coordination signal in the first frequency band, and
the second frequency transceiver being configured to perform direct wireless communications in a second frequency band with the another wireless communication station in accordance with the scheduling information.

Another exemplary method is directed to assigning with a processor of a control station communication resources for direct communications between wireless communication stations in a second frequency band; and transmitting a wireless coordination signal in a first frequency band to a wireless communication station and another wireless control station, the wireless coordination signal including scheduling information that manages establishment of direct communications between the wireless communication station and another wireless communication station, wherein a lowest frequency of the first frequency band being 1 GHz or higher;

receiving at the wireless communication station the wireless coordination signal; and establishing the direct wireless communications in the second frequency band in accordance with the scheduling information.

The "system" means a logical collection of multiple apparatuses (or functional modules realizing certain functions) irrespective of whether the apparatuses or the functional modules are provided in a single casing.

According to the present invention, it is possible to provide an excellent communication apparatus, communication method, and communication system capable of appropriate coordination with multiple communication partners performing millimeter wave communication.

According to the present invention, it is possible to subsidiarily use microwave communication at a frequency band of 2.4/5 GHz to secure appropriate coordination with multiple communication partners in order to realize desired data transmission using millimeter-wave communication at a frequency band of 60 GHz.

Further features and advantages of the present invention will become apparent from the following description of exemplary embodiments with reference to the attached drawings.

DESCRIPTION OF THE PREFERRED EMBODIMENTS

Embodiments of the present invention will herein be described in detail with reference to the attached drawings.

As described above in "Description of the Related Art", the wireless communication systems using the millimeter waves can use multiple transmission-reception antennas to form sharp antenna directivity (that is, beam-shape antenna directivity) in order to extend the communication range. However, the directional communication is not appropriate for transmission of control frames and, thus, the coordination may not be secured although the communication distance can be increased by directing the beams to the directions where communication partners are positioned.

For example, in directional communication systems using the microwaves (at a frequency band of 5-GHz) defined in IEEE 802.11, packets for the coordination are transmitted at a rate lower than that in data transmission to widely transmit scheduling information, etc. during a frame period to neighboring stations in order to secure the coordination. However, a sufficient amount of signal may not reach the neighboring stations over the communication using the millimeter waves even at a lower communication rate.

Wireless communication systems according to the embodiments of the present invention use both the wireless communication at a frequency band of 60 GHz and the wireless communication at a frequency band of 5 GHz. The wireless communication systems subsidiarily use the 5-GHz band for transmission of control information, such as beacons, used for the coordination in the 60-GHz band communication to allow a sufficient amount of control information to reach the neighboring stations. While particular values are provided above as examples, the frequency band for the direct links (between the terminal stations) have a center frequency that is at least 12 times that of a center frequency used in the coordination link. Thus a ratio of center frequencies is at least 12:1, with the ratio being exactly 12:1 when the direct links are centered at 60 GHz, and the coordination link is centered at 5 GHz. In the embodiments described herein, 5 GHz is used as the most common example, but the center frequency for the coordination link can be 1 GHz or higher in frequency.

A communication method using microwaves (electromagnetic waves at a frequency band of 5 GHz) used in IEEE 802.11a/b/g in widespread use as a wireless LAN standard is hereinafter referred to as a first communication method, and a communication method using millimeter waves (electromagnetic waves at a frequency band of 60 GHz) used in Very High Throughput (VHT) standard is hereinafter referred to as a second communication method. However, the first communication method and the second communication method are not necessarily limited to specific frequency bands.

Figure 1:
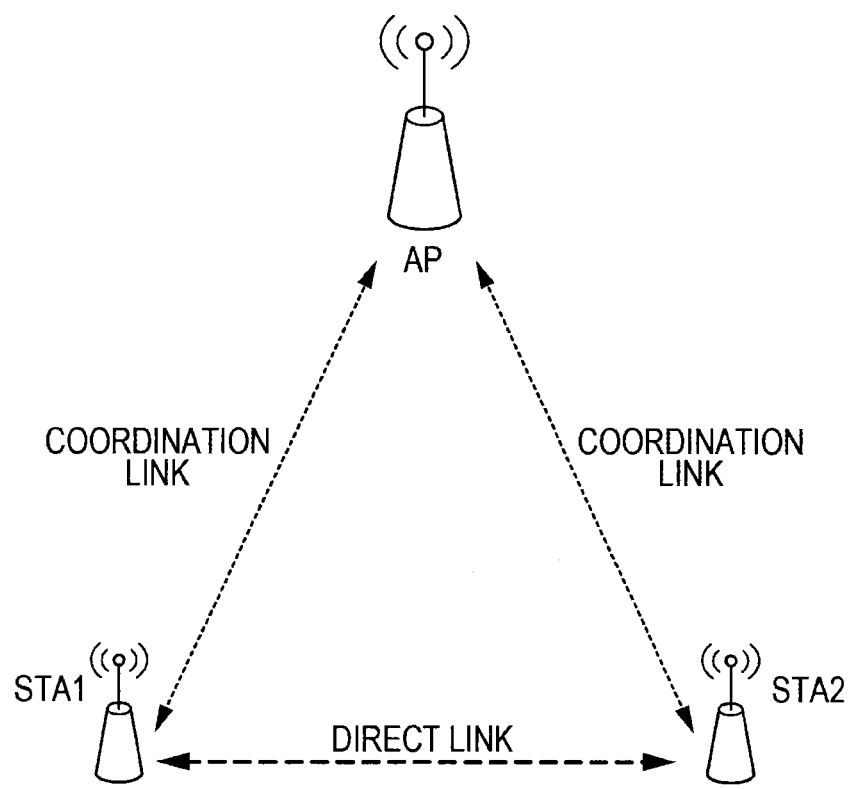
FIG. 1 schematically illustrates an example of the arrangement of a millimeter-wave wireless communication system according to an embodiment of the present invention.

FIG. 1 schematically illustrates an example of the arrangement of a millimeter-wave wireless communication system according to an embodiment of the present invention. The wireless communication system in FIG. 1 includes one control station, called an access point (AP) in IEEE 802.11, and at least one terminal station (two terminal stations STA1 and STA2 in the example in FIG. 1).

The control station (AP) establishes a coordination link according to the first communication method using the microwaves with each of the terminal stations (STA1 and STA2) in the own cell to notify the terminal stations of the control information including the scheduling information in the cell. This scheduling information may optionally include the assignment of communication resources (e.g., bandwidth, frequencies, and/or time) for use in the direct links.

Although the data communication between the terminal stations STA1 and STA2 may be via the control station (AP), a direct link that directly connects the terminal stations is mainly established to perform direct data communication between the terminal stations STA1 and STA2 in the present embodiment. The second communication method using the millimeter waves is applied to the direct link. Accordingly, the terminal stations STA1 and STA2 scheduled by the control station (AP) form the directivity for each other to realize the improvement in communication quality. Optionally, the AP may include in the scheduling information an arrangement by which one or more terminal stations serve as a relay station for another terminal station. This approach allows for range extension between different terminal stations, to broaden a reach of "direct links" between stations using one or more intermediate stations.

Figure 2:
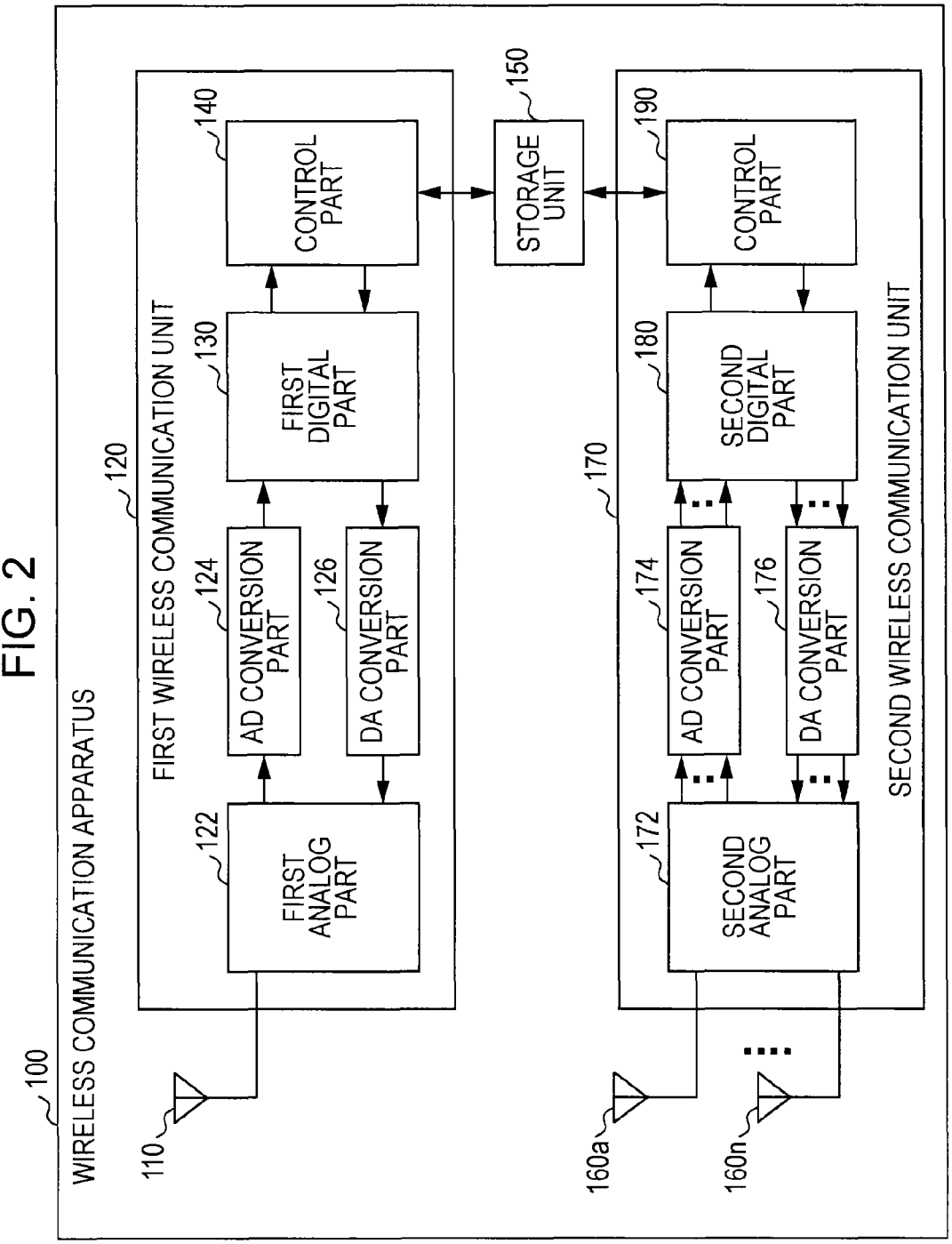
FIG. 2 is a block diagram showing an example of the configuration of a wireless communication apparatus applicable to the present invention.

FIG. 2 is a block diagram showing an example of the configuration of a wireless communication apparatus 100 capable of operating as a terminal station (STA) in the wireless communication system according to the present embodiment. Although the control station (AP) performs only the coordination according to the first communication method in the example in FIG. 1, the wireless communication apparatus 100 is similarly configured also when the control station (AP) performs the data communication according to the second communication method.

Referring to FIG. 2, the wireless communication apparatus 100 includes an antenna 110, a first wireless communication unit 120, a storage unit 150, multiple antennas 160a to 160n, and a second wireless communication unit 170. The first wireless communication unit 120 includes a first analog part 122, an analog-to-digital (AD) conversion part 124, a digital-to-analog (DA) conversion part 126, a first digital part 130, and a control part 140. The second wireless communication unit 170 includes a second analog part 172, an AD conversion part 174, a DA conversion part 176, a second digital part 180, and a control part 190.

The antenna 110 is used in the wireless communication according to the first communication method. The antenna 110 transmits, for example, a control signal for securing the coordination in the second communication method according to the first communication method using the microwaves. In addition, the antenna 110 receives a control signal for securing the coordination in the second communication method according to the first communication method to supply the received control signal to the first analog part 122.

The first analog part 122 typically corresponds to a radio-frequency (RF) circuit for transmitting and receiving radio signals according to the first communication method. This feature may be referred to as a transmitter (for transmitting), a receiver (for receiving), or a transceiver (for transmitting and receiving). Specifically, the first analog part 122 low-noise amplifies and down-converts an RF reception signal received by the antenna 110 to supply the RF reception signal to the downstream AD conversion part 124. In addition, the first analog part 122 up-converts an analog transmission signal converted by the DA conversion part 126 into an RF-band transmission signal and power-amplifies the RF-band transmission signal to supply the transmission signal subjected to the up-conversion and the power amplification to the antenna 110.

The AD conversion part 124 converts the analog reception signal supplied from the first analog part 122 into a digital signal to supply the digital signal to the downstream first digital part 130. The DA conversion part 126 converts a digital transmission signal supplied from the first digital part 130 into an analog signal to supply the analog signal to the first analog part 122.

Figure 3:
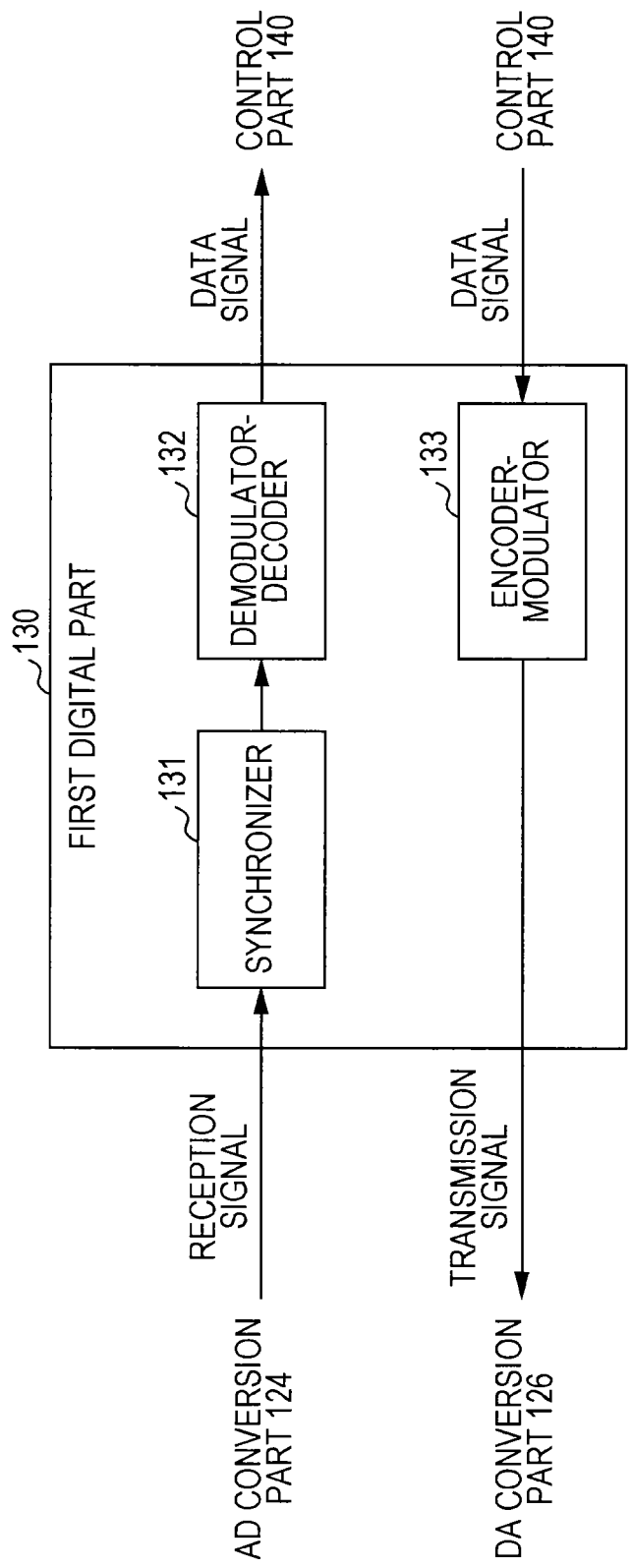
FIG. 3 is a block diagram showing an example of the internal configuration of a first digital part in FIG. 2.

FIG. 3 is a block diagram showing an example of the internal configuration of the first digital part 130. Referring to FIG. 3, the first digital part 130 includes a synchronizer 131, a demodulator-decoder 132, and an encoder-modulator 133. The synchronizer 131 synchronizes the timing to start reception processing of a reception signal received by the antenna 110, for example, with detection of the preamble at the beginning of the packet in the first communication method. The demodulator-decoder 132 demodulates and decodes the reception signal according to an arbitrary modulation method and an arbitrary encoding method used in the first communication method to acquire a data signal and supplies the acquired data signal to the control part 140. The encoder-modulator 133 encodes and modulates a data signal supplied from the control part 140 according to the arbitrary encoding method and the arbitrary modulation method used in the first communication method to generate a transmission signal and supplies the generated transmission signal to the DA conversion part 126.

Referring back to FIG. 2, the description of the configuration of the wireless communication apparatus 100 will be continued.

The control part 140 is composed of an arithmetic unit, such as a micro processor, and controls the entire operation of the first wireless communication unit 120. For example, the control part 140 supplies a control signal for securing the coordination in the second communication method to the first digital part 130 in response to a request from a certain application (for example, a higher layer program of the corresponding communication protocol). In addition, the control part 140 receives a decoded control signal from the first digital part 130 to acquire, for example, information about the coordination in the second communication method, described in the control signal, and appropriately stores the information in the storage unit 150.

The storage unit 150 is composed of a writable recording medium, such as a semiconductor memory, and is used as a working memory in which a program to execute the communication processing by the wireless communication apparatus 100 is loaded and various parameters are stored. In addition, the storage unit 150 stores the values of parameters for identifying optimal transmission and reception beam patterns in the wireless communication according to the second communication method by the second wireless communication unit 170.

The antennas 160a to 160n are used for the wireless communication according to the second communication method. Specifically, the antennas 160a to 160n each transmit a radio signal weighted with a certain weight factor by using the millimeter waves. In addition, the antennas 160a to 160n each receives a millimeter-wave radio signal and supplies the received millimeter-wave radio signal to the second analog part 172.

The second analog part 172 typically corresponds to an RF circuit for transmitting and receiving radio signals according to the second communication method. Specifically, the second analog part 172 low-noise amplifies and down-converts multiple reception signals received by the antennas 160a to 160n to supply the reception signals to the downstream AD conversion part 174. In addition, the second analog part 172 up-converts multiple analog transmission signals converted by the DA conversion part 176 into RF-band transmission signals and power-amplifies the RF-band transmission signals to supply the RF-band transmission signals subjected to the up-conversion and the power amplification to the antennas 160a to 160n.

The AD conversion part 174 converts the multiple analog reception signals supplied from the second analog part 172 into digital signals to supply the digital signals to the downstream second digital part 180. The DA conversion part 176 converts multiple digital transmission signals supplied from the second digital part 180 into analog signals to supply the analog signals to the second analog part 172.

The second digital part 180 is typically composed of a circuit for demodulating and decoding a reception signal according to the second communication method and a circuit for encoding and modulating a transmission signal according to the second communication method.

Figure 4:
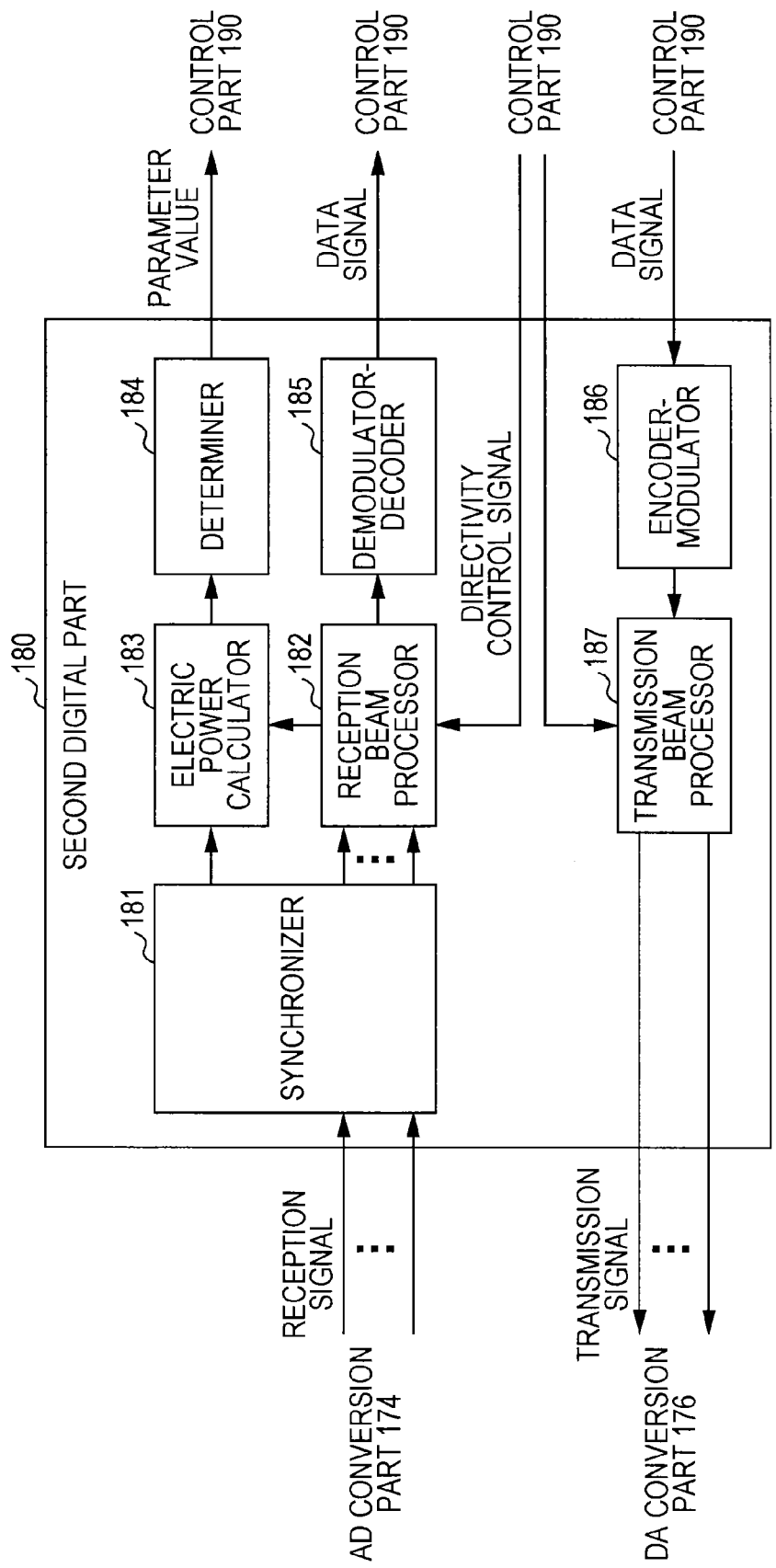
FIG. 4 is a block diagram showing an example of the internal configuration of a second digital part in FIG. 2.

FIG. 4 is a block diagram showing an example of the internal configuration of the second digital part 180. Referring to FIG. 4, the second digital part 180 includes a synchronizer 181, a reception beam processor 182, an electric power calculator 183, a determiner 184, a demodulator-decoder 185, an encoder-modulator 186, and a transmission beam processor 187.

The synchronizer 181 synchronizes the timing to start reception processing of multiple reception signals received by the multiple antennas 160a to 160n, for example, with detection of the preambles at the beginning of the packets and supplies the reception signals to the reception beam processor 182.

The reception beam processor 182 weights the multiple reception signals supplied from the synchronizer 181 according to, for example, uniform distribution or Taylor distribution to control the directivity of the reception beams. Then, the reception beam processor 182 supplies the weighted reception signals to the electric power calculator 183 and the demodulator-decoder 185.

In learning of the optimal transmission and reception beam patterns, the electric power calculator 183 calculates the value of reception power of the reception signal transmitted and received in each of the transmission and reception beam patterns and sequentially supplies the calculated value of reception power to the determiner 184. The determiner 184 determines the values of parameters for identifying the optimal transmission beam pattern and reception beam pattern on the basis of the value of reception power supplied from the electric power calculator 183. The optimal beam pattern typically means a beam pattern having a maximum value of reception power, among a series of values of reception power supplied from the electric power calculator 183 for one beam learning signal.

The demodulator-decoder 185 demodulates and decodes the reception signal weighted by the reception beam processor 182 according to an arbitrary modulation method and an arbitrary encoding method used in the second communication method to acquire a data signal. Then, the demodulator-decoder 185 supplies the acquired data signal to the control part 190.

The encoder-modulator 186 encodes and modulates a data signal supplied from the control part 190 according to the arbitrary encoding method and the arbitrary modulation method used in the second communication method to generate a transmission signal. Then, the encoder-modulator 186 supplies the generated transmission signal to the transmission beam processor 187.

The transmission beam processor 187 generates multiple transmission signals weighted according to, for example, the uniform distribution or the Taylor distribution from the transmission signal supplied from the encoder-modulator 186 to control the directivity of the transmission beams. The weight value used by the transmission beam processor 187 is specified by, for example, a directivity control signal supplied from the control part 190. The multiple transmission signals weighted by the transmission beam processor 187 are supplied to the DA conversion part 176.

Referring back to FIG. 2, the description of the configuration of the wireless communication apparatus 100 will be continued.

The control part 190 is composed of an arithmetic unit, such as a micro processor, and controls the entire operation of the second wireless communication unit 170. In addition, the control part 190 acquires the value of a parameter for identifying an optimal transmission beam pattern from the storage unit 150 and supplies the directivity control signal used for forming the optimal transmission beam pattern identified on the basis of the parameter value to the transmission beam processor 187 in the second digital part 180. As a result, the transmission beam in the wireless communication according to the second communication method by the wireless communication apparatus 100 is directed to the direction where a communication partner is positioned.

Figure 5:
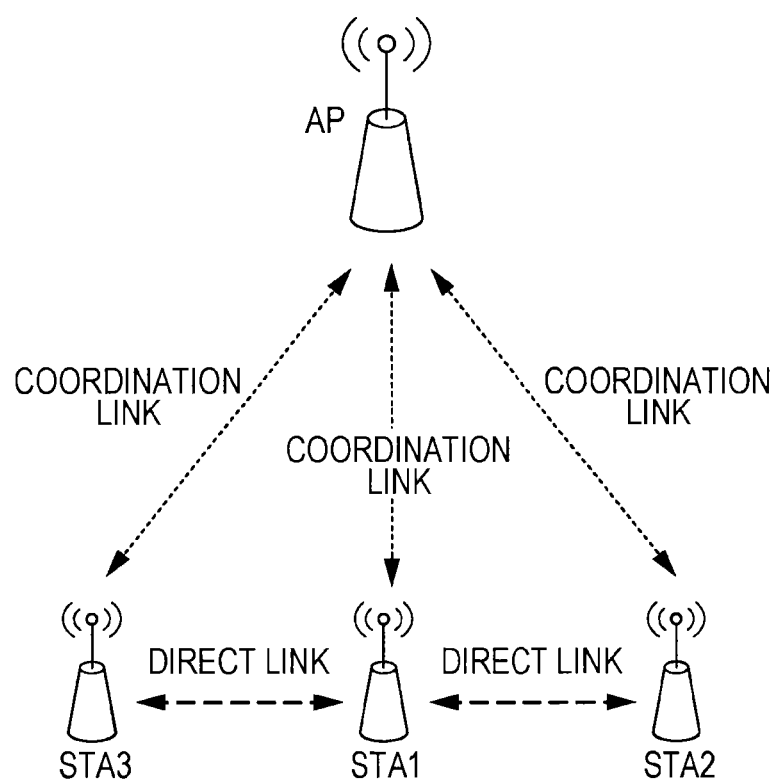
FIG. 5 schematically illustrates an example of the arrangement of a communication system.

FIG. 5 schematically illustrates an example of the arrangement of a communication system. It is assumed that the communication system in FIG. 5 is used in an environment in which the millimeter-wave communication according to the second communication method is enabled on the direct link between terminal stations (STA1 to STA3) while the millimeter-wave communication according to the second communication method is disabled between a control station (AP) and each of the terminal stations (STA1, STA2, and STA3) and only the microwave communication according to the first communication method is enabled therebetween. The communication according to the second communication method is disabled between the control station (AP) and each of the terminal stations (STA1, STA2, and STA3) because, for example, the communication distance is long or the communication is performed over a wall.

The control station (AP) establishes the coordination link according to the first communication method using the microwaves with each of the terminal stations (STA1 to STA3) in the own cell to notify the terminal stations of the control information including the scheduling information in the cell.

The direct link is established between the terminal stations STA1 and STA2 in accordance with the scheduling information notified from the control station (AP) via the coordination link, and the terminal stations STA1 and STA2 perform the direct data communication over the millimeter-wave communication according to the second communication method. Similarly, the direct link is established between the terminal stations STA1 and STA3, and the terminal stations STA1 and STA3 perform the direct data communication over the millimeter-wave communication according to the second communication method. The terminal stations STA1 and STA2 and the terminal stations STA1 and STA3 form the directivity for each other to realize the improvement in communication quality.

Figure 6:
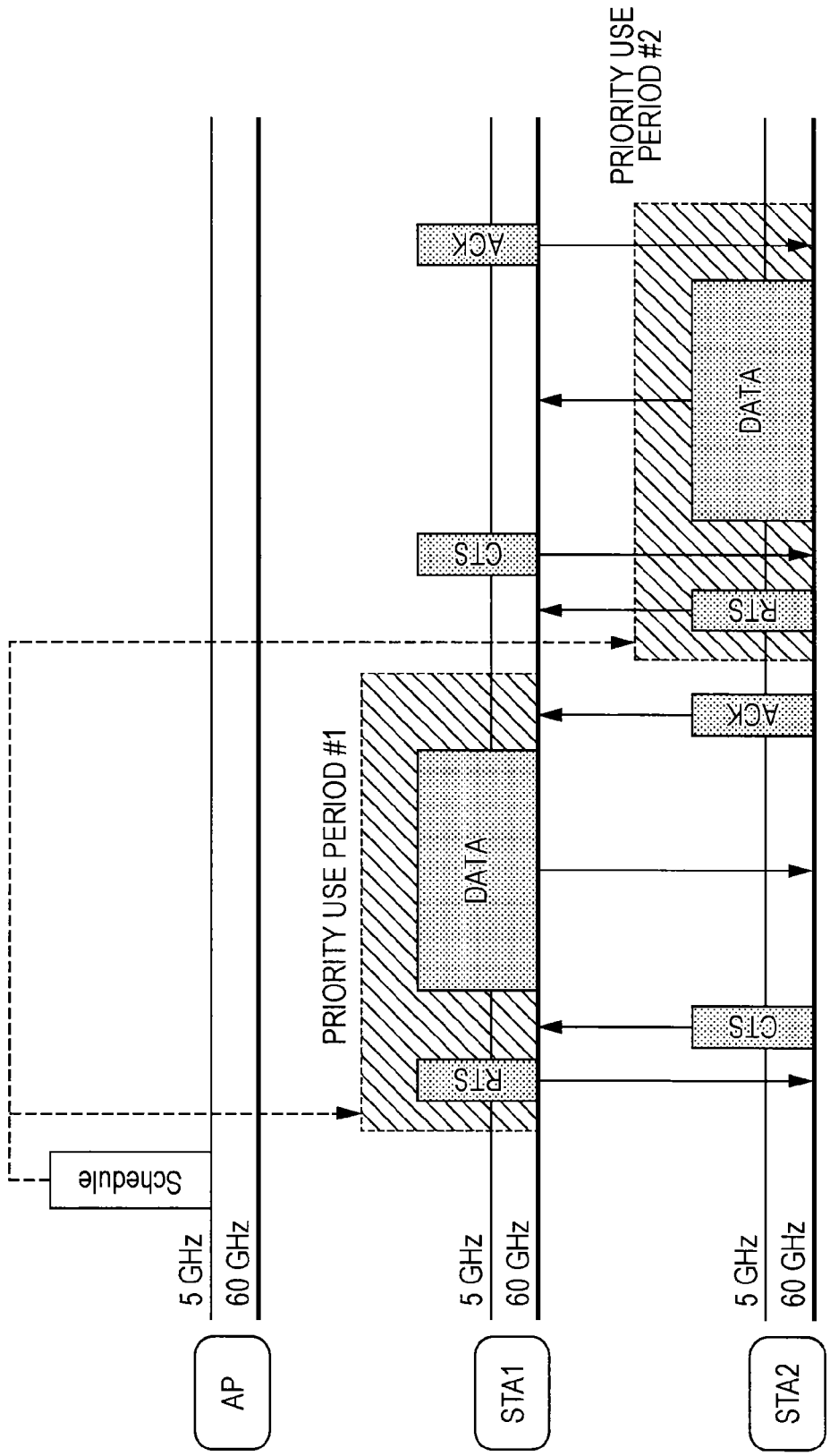
FIG. 6 shows an exemplary communication sequence between a control station and terminal stations in the use environment shown in FIG. 5.

FIG. 6 shows an exemplary communication sequence between the control station (AP) and the terminal stations (STA1 and STA2) in the use environment shown in FIG. 5.

The control station (AP) allocates a priority use period #1 (as a communications resource) and a priority use period #2 during which the terminal stations (STA1 and STA2) have priority over other terminal stations in the millimeter-wave communication to the terminal stations (STA1 and STA2), respectively, in the own cell and notifies the terminal stations (STA1 and STA2) of the priority use periods #1 and #2, respectively, by using a scheduling frame (Schedule) in which the scheduling information including the priority use periods #1 and #2 is described. In other words, the control station (AP) notifies the terminal stations of the scheduling information to manage the data exchange in the own cell. The scheduling frame is transmitted over the coordination link established in accordance with the first communication method using the microwaves (5 GHz).

The control station (AP) performs the scheduling, that is, the allocation of the corresponding priority use period in response to, for example, a data transmission request from the terminal station (STA1 or STA2). An arbitrary frame may be used as the scheduling frame. For example, a beacon frame may also be used as the scheduling frame.

In the example in FIG. 6, only the millimeter-wave communication (60 GHz) according to the second communication method is performed during the priority use periods #1 and #2. Each of the terminal stations (STA1 and STA2) applies a Request to Send (RTS)/Clear to Send (CTS) procedure during the priority use period allocated to the own station.

During the priority use period #1, the terminal station STA1 transmits an RTS frame to the terminal station STA2 to which data is to be transmitted. Then, the terminal station STA1 transmits a data frame to the terminal station STA2 upon reception of a CTS frame from the terminal station STA2. When the reception of the data frame is terminated, the terminal station STA2 returns an acknowledgement (ACK) frame.

During the subsequent priority use period #2, the terminal station STA2 transmits an RTS frame to the terminal station STA1 to which data is to be transmitted. Then, the terminal station STA2 transmits a data frame to the terminal station STA1 upon reception of a CTS frame from the terminal station STA1. When the reception of the data frame is terminated, the terminal station STA1 returns an ACK frame.

The terminal stations may not necessarily use the RTS/CTS procedure and may transmit the data frame without the RTS/CTS procedure during the priority use periods.

The use environment shown in FIGS. 5 and 6 is exemplified by a case in which one control station (AP) is installed at home, the communication according to the first communication method using the microwaves is established with each terminal station installed in rooms different from the room of the control station (AP), and the high-speed communication according to the second communication method using the millimeter waves is established between the terminal stations (STA1 and STA2) in the same room.

Figure 7:
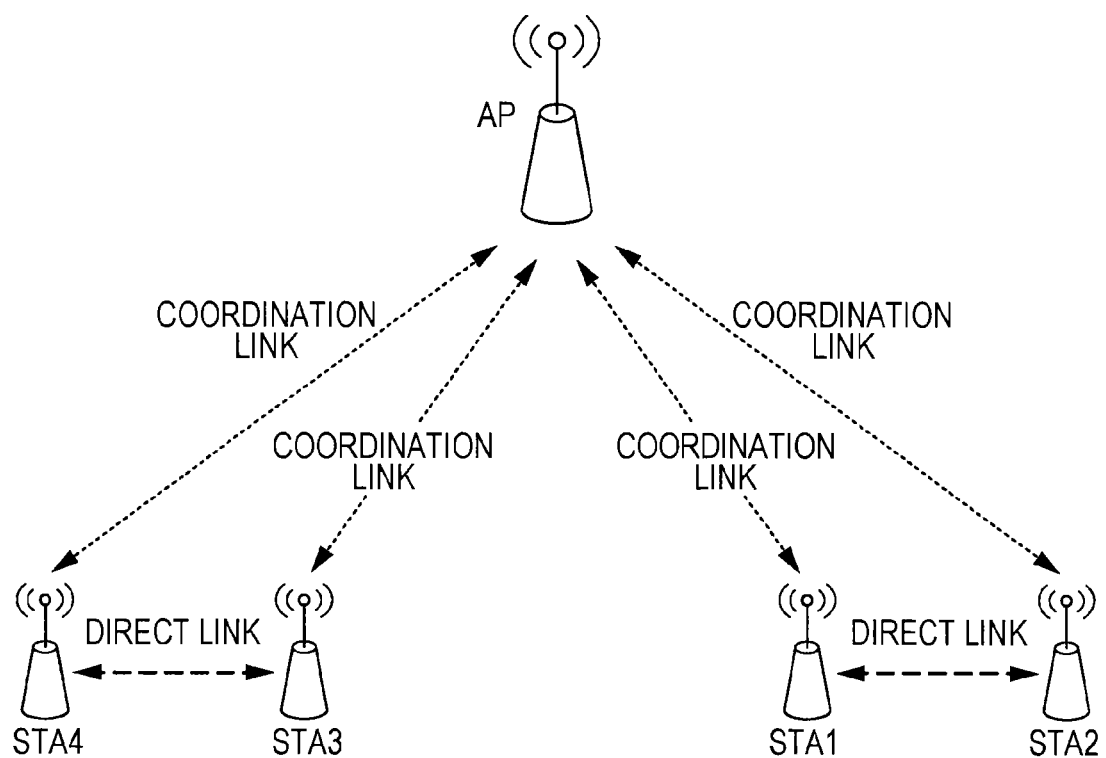
FIG. 7 schematically illustrates an example of the arrangement of another communication system.

FIG. 7 schematically illustrates an example of the arrangement of another communication system. It is assumed that the communication system in FIG. 7 is used in the following environment:

(1) The millimeter-wave communication according to the second communication method is disabled between the control station (AP) and each of the terminal stations (STA1, STA2, STA3, and STA4) and only the microwave communication according to the first communication method is enabled therebetween.

(2) The millimeter-wave communication according to the second communication method is enabled on the direct links between the terminal stations STA1 and STA2 and between the terminal stations STA3 and STA4 while the millimeter-wave communication according to the second communication method is disabled between the terminal stations STA1 and STA3, the terminal stations STA1 and STA4, the terminal stations STA2 and STA3, and the terminal stations STA2 and STA4.

The millimeter-wave communication according to the second communication method is disabled because, for example, the communication distance is long or the communication is performed over a wall. For example, it is assumed that the terminal stations STA1 and STA2 are in one room and the terminal stations STA3 and STA4 are in another room. In this case, the millimeter-wave communication between the terminal stations STA1 and STA2 and the millimeter-wave communication between the terminal stations STA3 and STA4 are not affected by the transmission loss over the walls. Accordingly, it is possible to simultaneously schedule the data exchange over the millimeter-wave communication in each room.

Figure 8:
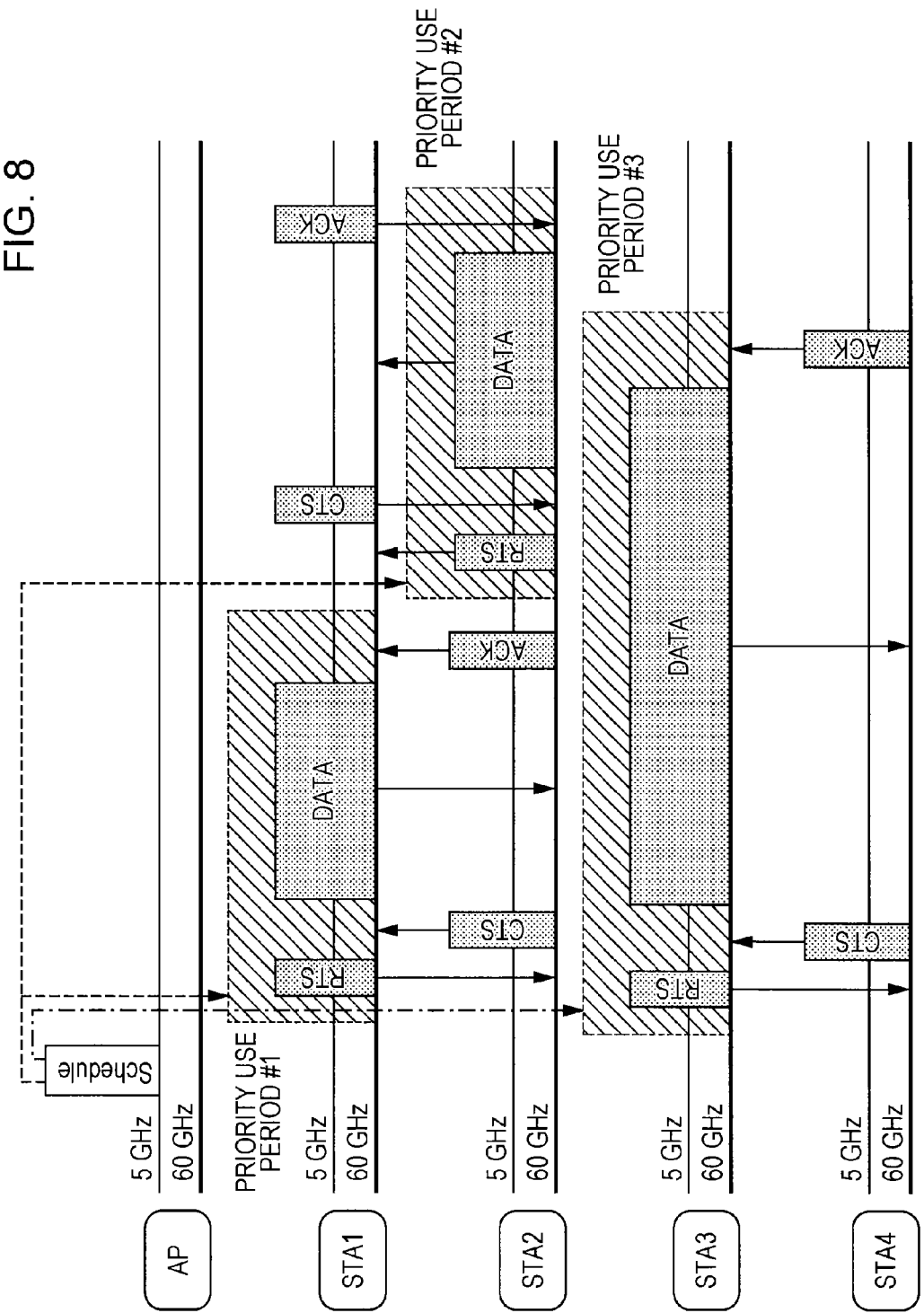
FIG. 8 shows an exemplary communication sequence between a control station and terminal stations in the use environment shown in FIG. 7.

FIG. 8 shows an exemplary communication sequence between the control station (AP) and the terminal stations (STA1, STA2, STA3, and STA4) in the use environment shown in FIG. 7.

The control station (AP) accommodates the terminal stations STA1 and STA2 in one room and the terminal stations STA3 and STA4 in another room in the own cell over the microwave communication according to the first communication method.

The control station (AP) notifies the terminal stations of the scheduling information to manage the data exchange in the own cell. In the example in FIG. 8, the control station (AP) allocates a priority use period #1, a priority use period #2, and a priority use period #3 during which the millimeter-wave communication can be used to the terminal stations STA1, STA2, and STA3, respectively, and notifies the terminal stations STA1, STA2, and STA3 of the priority use periods #1, #2, and #3, respectively, by using a scheduling frame (Schedule) in which the scheduling information including the priority use periods #1, #2, and #3 is described. The scheduling frame is transmitted over the coordination link established in accordance with the first communication method using the microwaves (5 GHz).

In the use environment in FIG. 7, it is possible to simultaneously schedule the data exchange over the millimeter-wave communication in each room. Accordingly, the control station (AP) can perform simultaneous scheduling, that is, duplicate scheduling of the priority use periods #1 and #2 allocated to one room and the priority use period #3 allocated to the other room.

In the example in FIG. 8, during each of the priority use periods #1, #2, and #3, only the millimeter-wave communication (60 GHz) according to the second communication method is enabled. Each of the terminal stations STA1, STA2, and STA3 applies the RTS/CTS procedure during the priority use period allocated to the own station.

In one room, during the priority use period #1, the terminal station STA1 transmits an RTS frame to the terminal station STA2 to which data is to be transmitted. Then, the terminal station STA1 transmits a data frame to the terminal station STA2 upon reception of a CTS frame from the terminal station STA2. When the reception of the data frame is terminated, the terminal station STA2 returns an ACK frame. During the subsequent priority use period #2, the terminal station STA2 transmits an RTS frame to the terminal station STA1 to which data is to be transmitted. Then, the terminal station STA2 transmits a data frame to the terminal station STA1 upon reception of a CTS frame from the terminal station STA1. When the reception of the data frame is terminated, the terminal station STA1 returns an ACK frame.

In the other room, during the priority use period #3, the terminal station STA3 transmits an RTS frame to the terminal station STA4 to which data is to be transmitted. Then, the terminal station STA3 transmits a data frame to the terminal station STA4 upon reception of a CTS frame from the terminal station STA4. When the reception of the data frame is terminated, the terminal station STA4 returns an ACK frame.

The terminal stations may not necessarily use the RTS/CTS procedure and may transmit the data frame without the RTS/CTS procedure during the priority use periods.

As shown in FIGS. 7 and 8, in order to realize the simultaneous scheduling of the data exchange over the millimeter-wave communication, it is necessary for the control station (AP) to determine which terminal station each terminal station in the own cell is in a communication enabled state with. It is also important to acquire information indicating whether the terminal stations can establish the microwave communication according to the first communication method or the millimeter-wave communication according to the second communication method.

The control station (AP) determines the communication enabled state of each terminal station by, for example, a method of causing the terminal station to report information about the communication enabled state. Alternatively, a method in which the terminal station uses a beacon signal to acquire the communication enabled state may be adopted. Specifically, each terminal station uses the microwave communication according to the first communication method and the millimeter-wave communication according to the second communication method to periodically transmit the beacon signal. The terminal station determines that the terminal station is in the communication enabled state with the neighboring station from which the beacon signal is transmitted and the communication method by which the communication is enabled on the basis of reception of the beacon signal or reception of the beacon signal of a signal strength higher than a certain value. Information about the communication enabled state of each terminal station can be used to flexibly switch between the data communication using the millimeter waves and the data communication using the microwaves.

Figure 9:
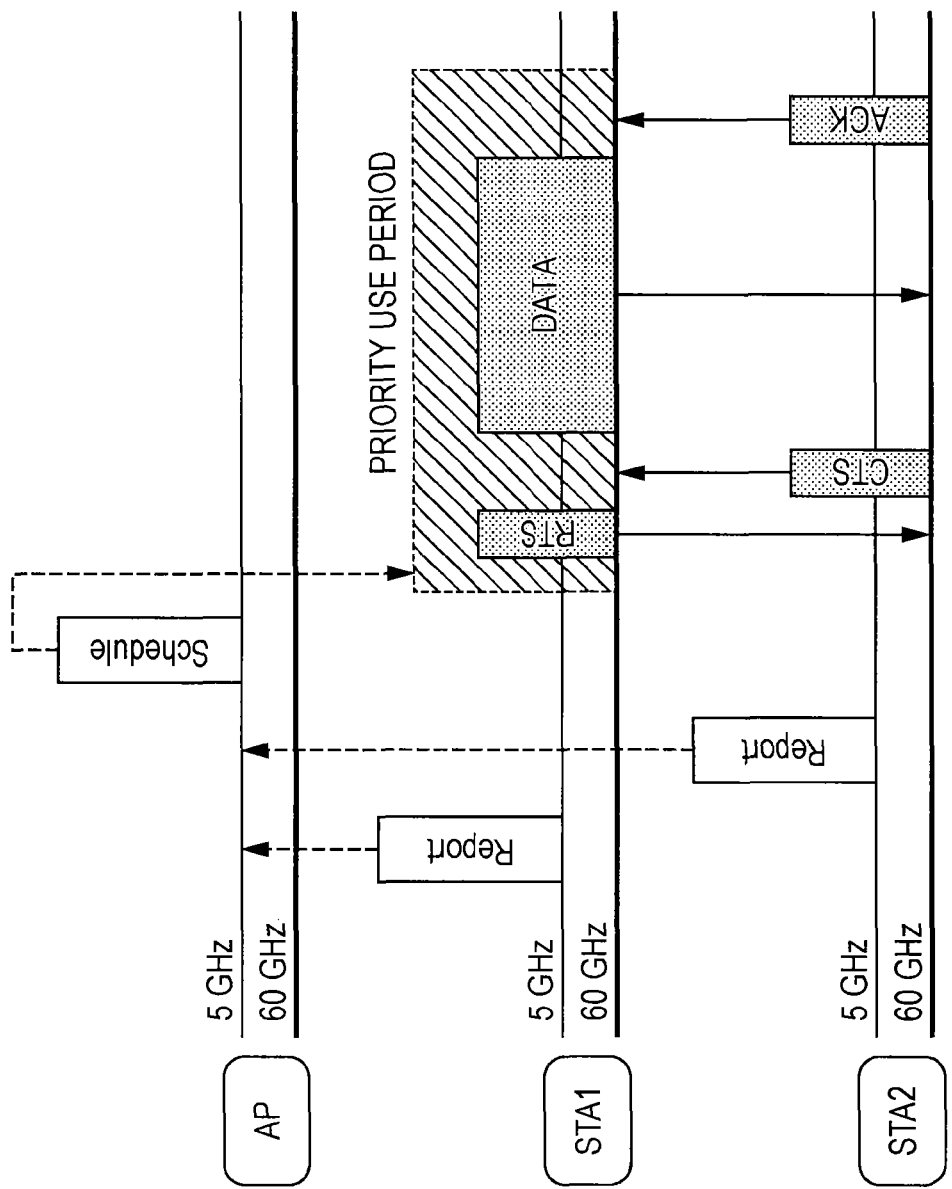
FIG. 9 shows an exemplary communication sequence in which the control station schedules data exchange in accordance with a communication enabled state of each terminal station in the use environment shown in FIG. 7.

FIG. 9 shows an exemplary communication sequence in which the control station (AP) schedules the data exchange in accordance with the communication enabled state of each of the terminal stations (STA1 and STA2). The use environment shown in FIG. 7 is assumed here.

The terminal station STA1 transmits a report frame (Report) including the communication enabled state in which the millimeter-wave communication according to the second communication method (and the microwave communication according to the first communication method) is enabled with the terminal station STA2 but only the microwave communication according to the first communication method is enabled with the control station (AP) to the control station (AP). The terminal station STA2 transmits a report frame (Report) including the communication enabled state in which the millimeter-wave communication according to the second communication method (and the microwave communication according to the first communication method) is enabled with the terminal station STA1 but only the microwave communication according to the first communication method is enabled with the control station (AP) and the terminal station STA3 to the control station (AP). The report frame is transmitted over the coordination link established in accordance with the first communication method using the microwaves (5 GHz).

The control station (AP) performs the scheduling for every communication method (frequency band) on the basis of the communication enabled state of each of the terminal stations STA1 and STA2 and notifies the terminal stations STA1 and STA2 of the scheduling information to manage the data exchange in the own cell. In the example in FIG. 9, the control station (AP) allocates a priority use period during which the millimeter-wave communication can be used to the terminal station STA1 and notifies the terminal station STA1 of the priority use period by using a scheduling frame (Schedule) in which the scheduling information including the priority use period is described. The scheduling frame is transmitted over the coordination link established in accordance with the first communication method using the microwaves (5 GHz).

In the example in FIG. 9, the terminal station STA1 applies the RTS/CTS procedure during the priority use period allocated to the own station. During the priority use period, the direct data communication is performed according to the second communication method using the millimeter waves (60 GHz). The terminal station STA1 transmits an RTS frame to the terminal station STA2 to which data is to be transmitted. Then, the terminal station STA1 transmits a data frame to the terminal station STA2 upon reception of a CTS frame from the terminal station STA2. When the reception of the data frame is terminated, the terminal station STA2 returns an ACK frame.

How the control station (AP) performs the scheduling of the data exchange in accordance with the communication enabled state of each terminal station will now be described, taking a use environment shown in FIG. 10 as an example.

Figure 10:
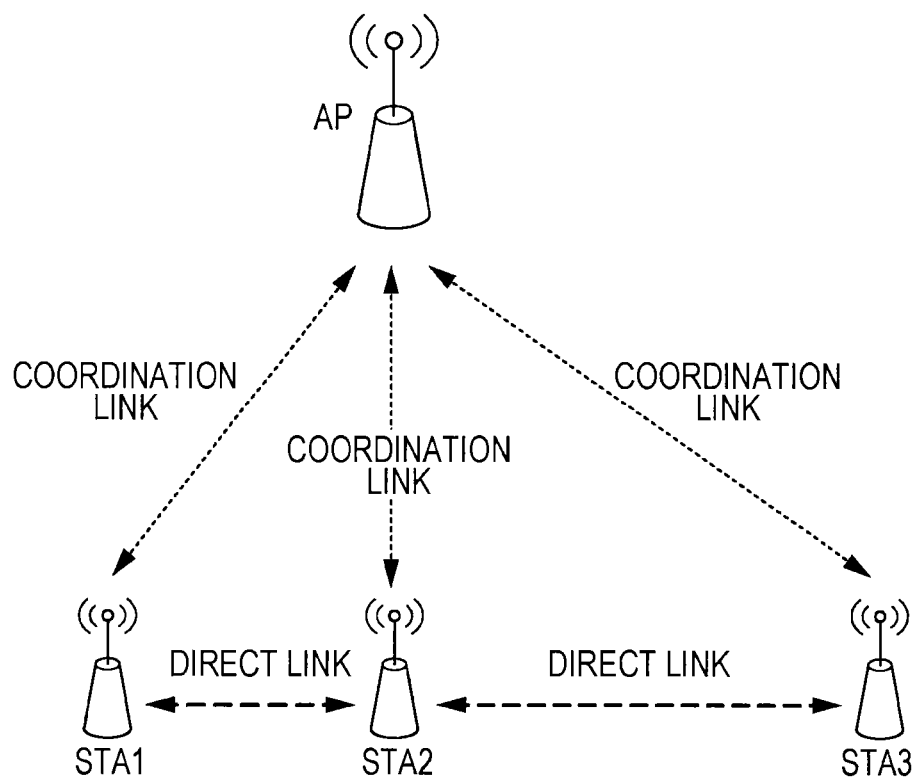
FIG. 10 schematically illustrates an example of the arrangement of another communication system.

In the use environment in FIG. 10, the millimeter-wave communication according to the second communication method is disabled between the control station (AP) and each of the terminal stations (STA1, STA2, and STA3) and only the microwave communication according to the first communication method is enabled therebetween. The following communication enabled states are assumed between the terminal stations in the example in FIG. 10. The millimeter-wave communication according to the second communication method (and the microwave communication according to the first communication method) is enabled on the direct link between the terminal stations STA1 and STA2, only the microwave communication according to the first communication method is enabled on the direct link between the terminal stations STA2 and STA3, and the communication is disabled between the terminal stations STA1 and STA3 by any communication method and at any frequency band.

The millimeter-wave communication according to the second communication method is disabled between the terminal stations STA2 and STA3 because, for example, the communication distance is long or the communication is performed over a wall. The communication is disabled between the terminal stations STA1 and STA3 by any communication method and at any frequency band because, for example, the communication distance is longer or an obstacle blocking even the microwaves exists between the terminal stations STA1 and STA3.

The control station (AP) establishes the coordination link according to the first communication method using the microwaves with each of the terminal stations (STA1 to STA3) in the own cell. The terminal stations (STA1 to STA3) each notify the control station (AP) of the communication enabled state of the own station over the coordination link. The control station (AP) performs the scheduling in the cell on the basis of the communication enabled state of each of the terminal stations (STA1 to STA3) and notifies the terminal stations of the control information including the scheduling information over the coordination link.

The direct link is established between the terminal stations STA1 and STA2 in accordance with the scheduling information notified from the control station (AP) over the coordination link and the direct data communication is performed between the terminal stations STA1 and STA2 over the millimeter-wave communication according to the second communication method. The terminal stations STA1 and STA2 form the directivity for each other to realize the improvement in communication quality.

In contrast, the direct link is established between the terminal stations STA2 and STA3 in accordance with the scheduling information notified from the control station (AP) over the coordination link. However, the direct data communication is performed between the terminal stations STA2 and STA3 over the microwave communication according to the first communication method.

Figure 11:
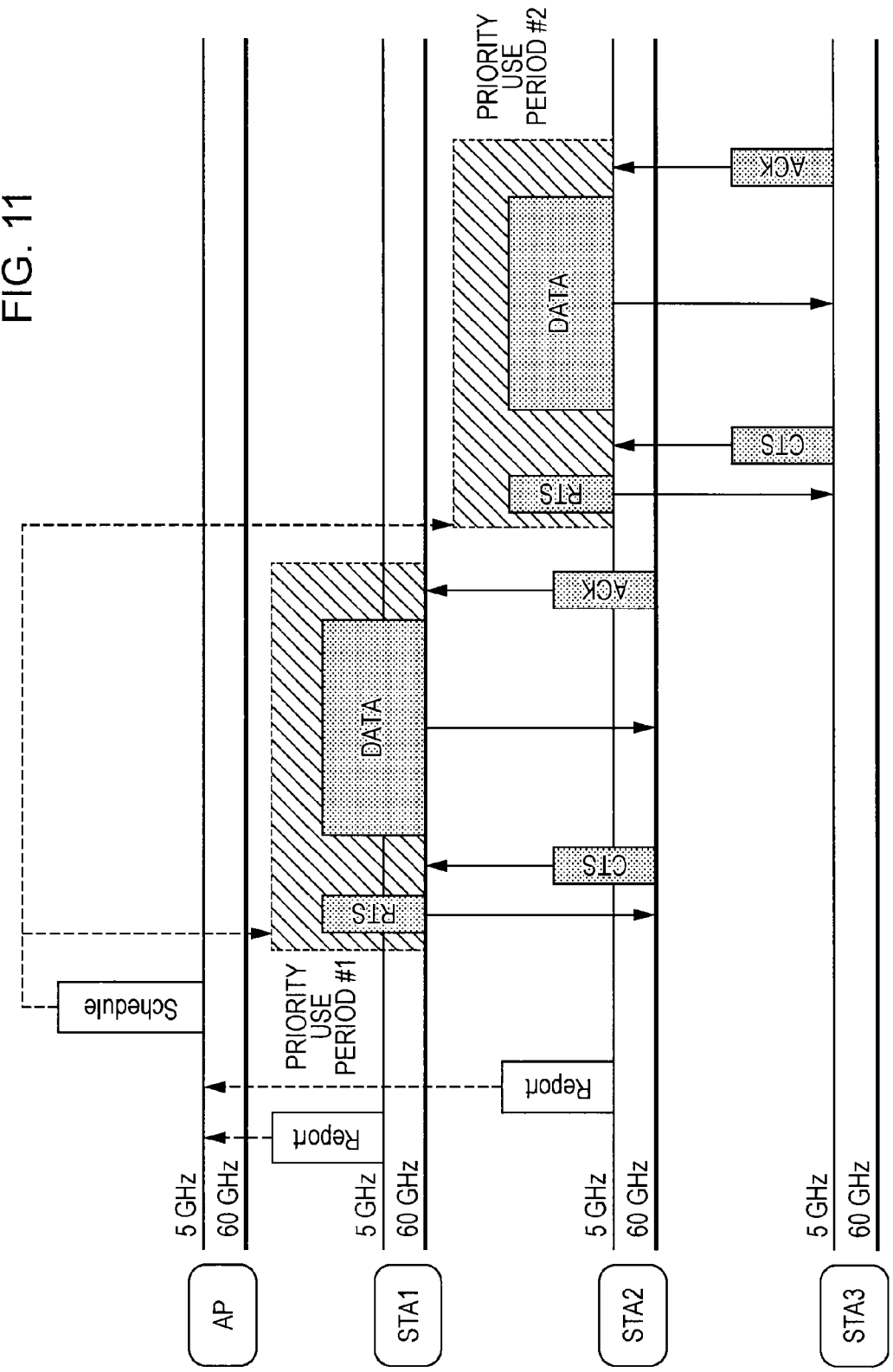
FIG. 11 shows an exemplary communication sequence between a control station and terminal stations in the use environment shown in FIG. 10.

FIG. 11 shows an exemplary communication sequence between the control station (AP) and the terminal stations (STA1, STA2, and STA3) in the use environment shown in FIG. 10. It is assumed in the example in FIG. 11 that each of the terminal stations (STA1, STA2, and STA3) has acquired the communication enabled state of own station.

The terminal station STA1 transmits a report frame (Report) including the communication enabled state in which the millimeter-wave communication according to the second communication method (and the microwave communication according to the first communication method) is enabled with the terminal station STA2 but only the microwave communication according to the first communication method is enabled with the control station (AP) to the control station (AP). The terminal station STA2 transmits a report frame (Report) including the communication enabled state in which the millimeter-wave communication according to the second communication method (and the microwave communication according to the first communication method) is enabled with the terminal station STA1 but only the microwave communication according to the first communication method is enabled with the control station (AP) and the terminal station STA3 to the control station (AP). The report frame is transmitted over the coordination link established in accordance with the first communication method using the microwaves (5 GHz).

The control station (AP) performs the scheduling for every communication method (every frequency band) on the basis of the communication enabled state of each of the terminal stations STA1 and STA2 and notifies the terminal stations STA1 and STA2 of the scheduling information to manage the data exchange in the own cell. In the example in FIG. 11, the control station (AP) allocates a priority use period #1 during which the millimeter-wave communication can be used to the terminal station STA1 and allocates a priority use period #2 during which the microwave communication can be used to the terminal station STA2. The control station (AP) notifies the terminal stations STA1 and STA2 of the priority use periods #1 and #2, respectively, by using a scheduling frame (Schedule) in which the scheduling information including the priority use periods #1 and #2 is described. The scheduling frame is transmitted over the coordination link established in accordance with the first communication method using the microwaves (5 GHz).

In the example in FIG. 11, each of the terminal stations STA1 and STA2 applies the RTS/CTS procedure during the priority use period allocated to the own station.

During the priority use period #1, the direct data communication according to the second communication method using the millimeter waves (60 GHz) is performed. The terminal station STA1 transmits an RTS frame to the terminal station STA2 to which data is to be transmitted. Then, the terminal station STA1 transmits a data frame to the terminal station STA2 upon reception of a CTS frame from the terminal station STA2. When the reception of the data frame is terminated, the terminal station STA2 returns an ACK frame.

During the subsequent priority use period #2, the direct data communication according to the first communication method using the microwaves (5 GHz) is performed. The terminal station STA2 transmits an RTS frame to the terminal station STA3 to which data is to be transmitted. Then, the terminal station STA2 transmits a data frame to the terminal station STA3 upon reception of a CTS frame from the terminal station STA3. When the reception of the data frame is terminated, the terminal station STA3 returns an ACK frame.

The terminal stations may not necessarily use the RTS/CTS procedure and may transmit the data frame without the RTS/CTS procedure during the priority use periods.

Although the data communication capable of flexibly switching between the millimeter-wave communication and the microwave communication on the basis of the communication enabled state is applied to the direct data communication between the terminal stations in the examples in FIGS. 10 and 11, the above data communication may be applied to the data communication between the control station (AP) and each terminal station.

Figure 12:
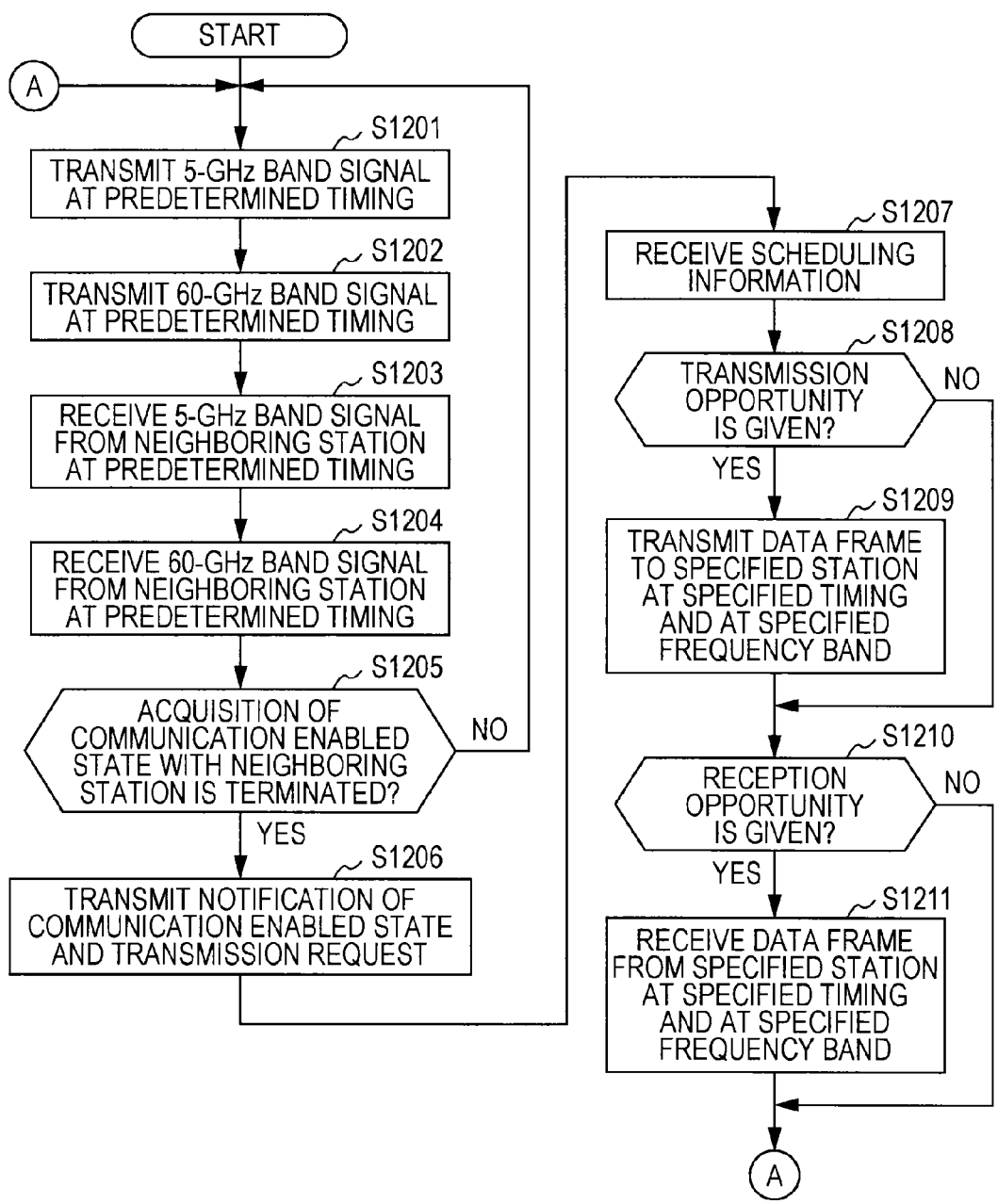
FIG. 12 is a flowchart showing an example of a process in which the wireless communication apparatus in FIG. 2 operates as a terminal station in any of the use environments shown in FIGS. 5, 7, and 10.

FIG. 12 is a flowchart showing an example of a process in which the wireless communication apparatus 100 in FIG. 2 operates as a terminal station (STA) in any of the use environments shown in FIGS. 5, 7, and 10.

Referring to FIG. 12, in Step S1201, the terminal station transmits a signal for acquiring the communication enabled state at each neighboring station over the microwave communication (5-GHz band) at predetermined timing. For example, a beacon signal can be used as the signal.

In Step S1202, the terminal station transmits a signal for acquiring the communication enabled state at each neighboring station over the millimeter-wave communication (60-GHz band) at another predetermined timing. For example, a beacon signal can be used as the signal.

In Step S1203, the terminal station acquires the communication enabled state with each neighboring station at the 5-GHz band upon reception of the signal from the neighboring station over the microwave communication (5-GHz band) at another predetermined timing. When the reception signal includes training information, the beam pattern in the first wireless communication unit 120 can be learned or updated.

In Step S1204, the terminal station acquires the communication enabled state with each neighboring station at the 60-GHz band upon reception of the signal from the neighboring station over the millimeter-wave communication (60-GHz band) at another predetermined timing. When the reception signal includes training information, the beam pattern in the second wireless communication unit 170 can be learned or updated.

In Step S1205, the terminal station determines whether the acquisition of the communication enabled state with each neighboring station is completed. If the terminal station determines that the acquisition of the communication enabled state with each neighboring station is not completed (NO in Step S1205), the terminal station repeats the above steps S1201 to S1204.

If the terminal station determines that the acquisition of the communication enabled state with each neighboring station is completed (YES in Step S1205), in Step S1206, the terminal station transmits a notification including information about the acquired communication enabled state to the control station. The information about the communication enabled state is described, for example, in a report frame and is notified over the coordination link established in accordance with the first communication method using the microwaves (5 GHz). The terminal station may transmit a request for data transmission over the direct communication with each neighboring station.

In Step S1207, the terminal station receives a scheduling frame including the scheduling information concerning the allocation of the communication opportunity for the direct communication from the control station. The scheduling frame is transmitted over the coordination link established in accordance with the first communication method using the microwaves (5 GHz). When the reception signal includes training information, the beam pattern in the first wireless communication unit 120 can be learned or updated.

The scheduling information may include information specifying transmission and reception beam patterns in the direct communication.

In Step S1208, the terminal station analyzes the scheduling information in the scheduling frame to determine whether an opportunity for the direct transmission to the neighboring station specified in the scheduling information is given. If the terminal station determines that an opportunity for the direct transmission to the neighboring station specified in the scheduling information is given (YES in Step S1208), in Step S1209, the terminal station directly transmits a data frame to the neighboring station during the specified communication period and by using the specified frequency band. When a beam pattern is specified in the scheduling information, the specified beam pattern is used to perform the transmission operation.

In Step S1210, the terminal station analyzes the scheduling information in the scheduling frame to determine whether an opportunity for the direct reception from the neighboring station specified in the scheduling information is given. If the terminal station determines that an opportunity for the direct reception from the neighboring station specified in the scheduling information is given (YES in Step S1210), in Step S1211, the terminal station directly receives a data frame from the neighboring station during the specified communication period and by using the specified frequency band. When a beam pattern is specified in the scheduling information, the specified beam pattern is used to perform the reception operation.

The transmission operation in Steps S1208 to S1209 may be performed after the reception operation in Steps S1210 to S1211.

Figure 13:
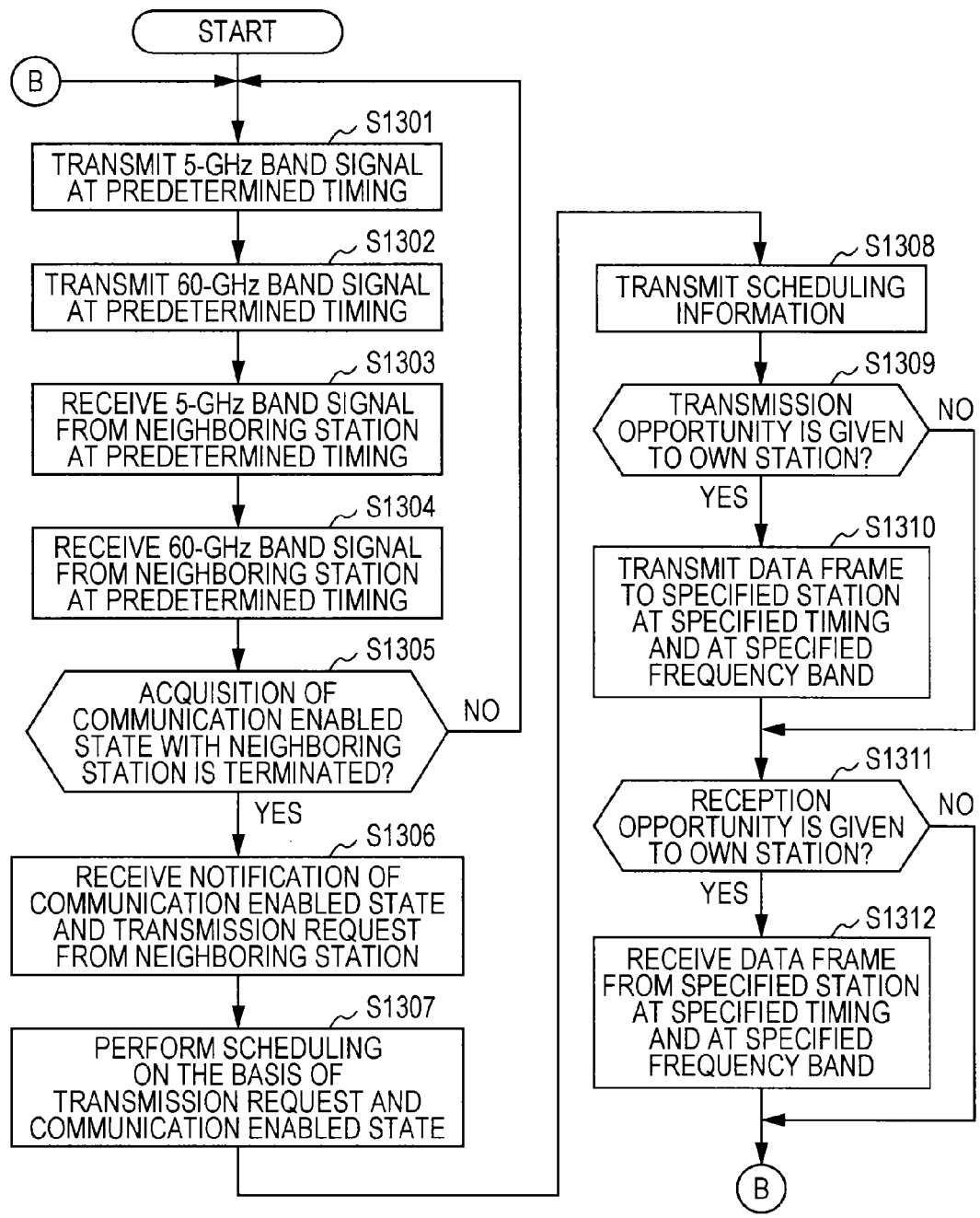
FIG. 13 is a flowchart showing an example of a process in which the wireless communication apparatus in FIG. 2 operates as a control station in any of the use environments shown in FIGS. 5, 7, and 10.

FIG. 13 is a flowchart showing an example of a process in which the wireless communication apparatus 100 in FIG. 2 operates as a control station (AP) in any of the use environments shown in FIGS. 5, 7, and 10.

Referring to FIG. 13, in Step S1301, the control station transmits a signal for acquiring the communication enabled state at each neighboring station over the microwave communication (5-GHz band) at predetermined timing. For example, a beacon signal can be used as the signal.

In Step S1302, the control station transmits a signal for acquiring the communication enabled state at each neighboring station over the millimeter-wave communication 60-GHz band) at another predetermined timing. For example, a beacon signal can be used as the signal.

In Step S1303, the control station acquires the communication enabled state with each neighboring station at the 5-GHz band upon reception of the signal from the neighboring station over the microwave communication (5-GHz band) at another predetermined timing. When the reception signal includes training information, the beam pattern in the first wireless communication unit 120 can be learned or updated.

In Step S1304, the control station acquires the communication enabled state with each neighboring station at the 60-GHz band upon reception of the signal from the neighboring station over the millimeter-wave communication (60-GHz band) at another predetermined timing. When the reception signal includes training information, the beam pattern in the second wireless communication unit 170 can be learned or updated.

In Step S1305, the control station determines whether the acquisition of the communication enabled state with each neighboring station is completed. If the control station determines that the acquisition of the communication enabled state with each neighboring station is not completed (NO in Step S1305), the control station repeats the above steps S1301 to S1304.

If the control station determines that the acquisition of the communication enabled state with each neighboring station is completed (YES in Step S1305), in Step S1306, the control station receives a notification of information about the communication enabled state from each neighboring station. The information about the communication enabled state is described, for example, in a report frame and is notified over the coordination link established in accordance with the first communication method using the microwaves (5 GHz). The control station may receive a request for data transmission over the direct communication between the terminal stations from each neighboring station.

In Step S1307, the control station performs scheduling for every communication method (frequency band) on the basis of the data transmission request and the communication enabled state from each terminal station. In Step S1308, the control station transmits the scheduling information to manage the data exchange in the own cell.

The scheduling frame is transmitted over the coordination link established in accordance with the first communication method using the microwaves (5 GHz). When the reception signal includes training information, the beam pattern in the first wireless communication unit 120 can be learned or updated. The scheduling information may include information specifying transmission and reception beam patterns in the direct communication.

In Step S1309, the control station determines whether a transmission opportunity is given to the own station. If the control station determines that a transmission opportunity is given to the own station (YES in Step S1309), in Step S1310, the control station transmits a data frame to a neighboring station which the control station specifies during the specified communication period and by using the specified frequency band. When the control station specifies a beam pattern, the specified beam pattern is used to perform the transmission operation.

In Step S1311, the control station determines whether a reception opportunity is given to the own station. If the control station determines that a reception opportunity is given to the own station (YES in Step S1311), in Step S1312, the control station receives a data frame from a neighboring station which the control station specifies during the specified communication period and by using the specified frequency band. When the control station specifies a beam pattern, the specified beam pattern is used to perform the reception operation.

The transmission operation in Steps S1309 to S1310 may be performed after the reception operation in Steps S1311 to S1312.

The present application contains subject matter related to that disclosed in Japanese Priority Patent Application JP 2010-087485 filed in the Japan Patent Office on Apr. 6, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising
circuitry configured to:
   receive a wireless coordination signal to set up a coordination link in a first frequency band;
   transmit a report frame via the coordination link, the report frame indicating capabilities of a second frequency band;
   perform wireless communication in the second frequency band with another electronic device, the second frequency band being higher than the first frequency band; and
   perform a Request to Send (RTS)/Clear to Send (CTS) procedure over the second frequency band with the another electronic device.

2. The electronic device of claim 1, wherein
the RTS/CTS procedure is initiated during a priority use period allocated to the electronic device according to scheduling information received in the first frequency band.

3. The electronic device of claim 1, wherein
a center frequency ratio of the second frequency band to the first frequency band is at least 12:1.

4. The electronic device of claim 1, wherein:
the first frequency band is centered at approximately 5 GHz, and the second frequency band is centered at approximately 60 GHz.

5. The electronic device of claim 2, wherein
a third communication station performs wireless communication with a fourth communication station in the second frequency band also in accordance with the scheduling information.

6. A communication apparatus comprising:
a first analog unit including one or more antennas;
a second analog unit including two or more antennas;
circuitry configured to:
   receive a wireless coordination signal to set up a coordination link in a first frequency band via the first analog unit;
   transmit a report frame via the coordination link, the report frame indicating capabilities of a second frequency band;
   perform wireless communication in the second frequency band with another electronic device via the second analog unit, the second frequency band being higher than the first frequency band; and
   perform a Request to Send (RTS)/Clear to Send (CTS) procedure over the second frequency band with the another electronic device.

7. The communication apparatus of claim 6, wherein
the RTS/CTS procedure is initiated during a priority use period allocated to the electronic device according to scheduling information received in the first frequency band.

8. The communication apparatus of claim 6, wherein
a center frequency ratio of the second frequency band to the first frequency band is at least 12:1.

9. The communication apparatus of claim 6, wherein:
the first frequency band is centered at approximately 5 GHz, and the second frequency band is centered at approximately 60 GHz.

10. The communication apparatus of claim 7, wherein a third communication station performs wireless communication with a fourth communication station in the second frequency band also in accordance with the scheduling information.

11. The communication apparatus of claim 6, wherein the first analog unit includes one antenna.

12. The communication apparatus of claim 6, wherein the second analog unit includes two antennas.

13. The communication apparatus of claim 6, wherein the second analog unit includes three antennas.

14. A method comprising:
receiving a wireless coordination signal to set up a coordination link in a first frequency band;
transmit a report frame via the coordination link, the report frame indicating capabilities of a second frequency band;
performing wireless communication in the second frequency band with another electronic device, the second frequency band being higher than the first frequency band;
performing a Request to Send (RTS)/Clear to Send (CTS) procedure over the second frequency band with the another electronic device.

15. The method of claim 14, wherein
the RTS/CTS procedure is initiated during a priority use period allocated to the electronic device according to scheduling information received in the first frequency band.

16. The method of claim 14, wherein
a center frequency ratio of the second frequency band to the first frequency band is at least 12:1.

17. The method of claim 14, wherein:
the first frequency band is centered at approximately 5 GHz, and the second frequency band is centered at approximately 60 GHz.

18. The method of claim 15, wherein a third communication station performs wireless communication with a fourth communication station in the second frequency band also in accordance with the scheduling information.

* * * * *